United States Patent
Crowell et al.

(10) Patent No.: US 7,734,902 B2
(45) Date of Patent: Jun. 8, 2010

(54) ADDITION OF A HARDWARE COMPONENT TO A RUNNING SYSTEM

(75) Inventors: Daniel M. Crowell, Rochester, MN (US); Philip J. Sanders, Rochester, MN (US); Allegra R. Segura, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/609,427

(22) Filed: Dec. 12, 2006

(65) Prior Publication Data

US 2008/0141010 A1 Jun. 12, 2008

(51) Int. Cl.
*G06F 15/177* (2006.01)

(52) U.S. Cl. ............................ 713/1; 713/100; 710/104; 710/302

(58) Field of Classification Search ...................... 713/1, 713/100; 710/104, 302
See application file for complete search history.

(56) References Cited

U.S. PATENT DOCUMENTS

| | | | | |
|---|---|---|---|---|
| 5,787,019 A | * | 7/1998 | Knight et al. ............... | 719/324 |
| 6,105,089 A | * | 8/2000 | Chari et al. ................. | 710/302 |
| 6,263,387 B1 | * | 7/2001 | Chrabaszcz ................. | 710/302 |
| 6,269,417 B1 | * | 7/2001 | Mahalingam ............... | 710/104 |
| 6,484,226 B1 | * | 11/2002 | Wallach et al. ............. | 710/302 |
| 6,711,645 B1 | | 3/2004 | Chari et al. | |
| 2004/0199696 A1 | | 10/2004 | Chari et al. | |

\* cited by examiner

*Primary Examiner*—Thuan N Du
(74) *Attorney, Agent, or Firm*—Dillon & Yudell LLP

(57) ABSTRACT

According to a method of data processing in a data processing system, a hardware management component receives from a software component of the data processing system a request for management access to a hardware component of the data processing system. In response to receipt of the request for management access, the hardware management component determines whether or not the request contains a parameter indicative of the intended scope of hardware components to be accessed in response to the request. In response to the request, the hardware management component selects a scope in accordance with the determination and issues one or more hardware management commands to one or more target hardware components of the data processing system within the selected scope, such that an operating state of the one or more target hardware components is modified.

15 Claims, 3 Drawing Sheets

ADDITION OF A HARDWARE COMPONENT TO A RUNNING SYSTEM

BACKGROUND OF THE INVENTION

1. Technical Field

The present invention relates generally to data processing systems and in particular to the addition of a hardware component to a running data processing system.

2. Description of the Related Art

The desire for higher performance and greater functionality in data processing systems in both the personal and commercial contexts has led the computer industry to continually improve computer systems. Generally, for both commercial and personal computer systems, improvements have focused on providing faster processors, larger upper level caches, larger random access memory (RAM), higher frequency buses, etc.

Additionally, with commercial systems in particular, improvements have also included providing greater processing resources, i.e., rather than replacing existing processors with faster ones, augmenting the total number of processors and linking them together to provide greater overall processing capability. Most current commercial systems are designed with multiple processors in a single system, and many commercial systems are distributed and/or networked systems with multiple individual systems interconnected to each other and sharing the processing workload. Even these "large-scale" commercial systems, however, are frequently upgraded or expanded as customer needs change.

When a data processing system is upgraded or changed, particularly with respect to its internal components, it is often necessary to power the system down before completing the installation. With externally connected I/O components, however, it may be possible to merely plug the component in while the system is powered-up and running. Irrespective of the method utilized to add the component (internally or externally), the system detects or receives an input indicating that additional hardware has been added or simply that a change in the system configuration has occurred. In response, the data processing system will (either automatically or with administrator intervention) initiate a system configuration upgrade and, if necessary, load the required drivers to complete the installation of the new hardware.

With large-scale commercial systems, the upgrade processes can be extremely time intensive, requiring up to several hours to complete in some situations. During that downtime, the customer cannot utilize the data processing system or a portion thereof. The outage is therefore very visible to the customer and may result in substantial financial loss, depending on the industry or specific use of the system. Also, a partial or full reboot of the system may be required to complete the integration of newly installed hardware components into the data processing system.

SUMMARY OF THE INVENTION

According to a method of data processing in a data processing system, a hardware management component receives from a software component of the data processing system a request for management access to a hardware component of the data processing system. In response to receipt of the request for management access, the hardware management component determines whether or not the request contains a parameter indicative of the intended scope of hardware components to be accessed in response to the request. In response to the request, the hardware management component selects a scope in accordance with the determination and issues one or more hardware management commands to one or more target hardware components of the data processing system within the selected scope, such that an operating state of the one or more target hardware components is modified.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
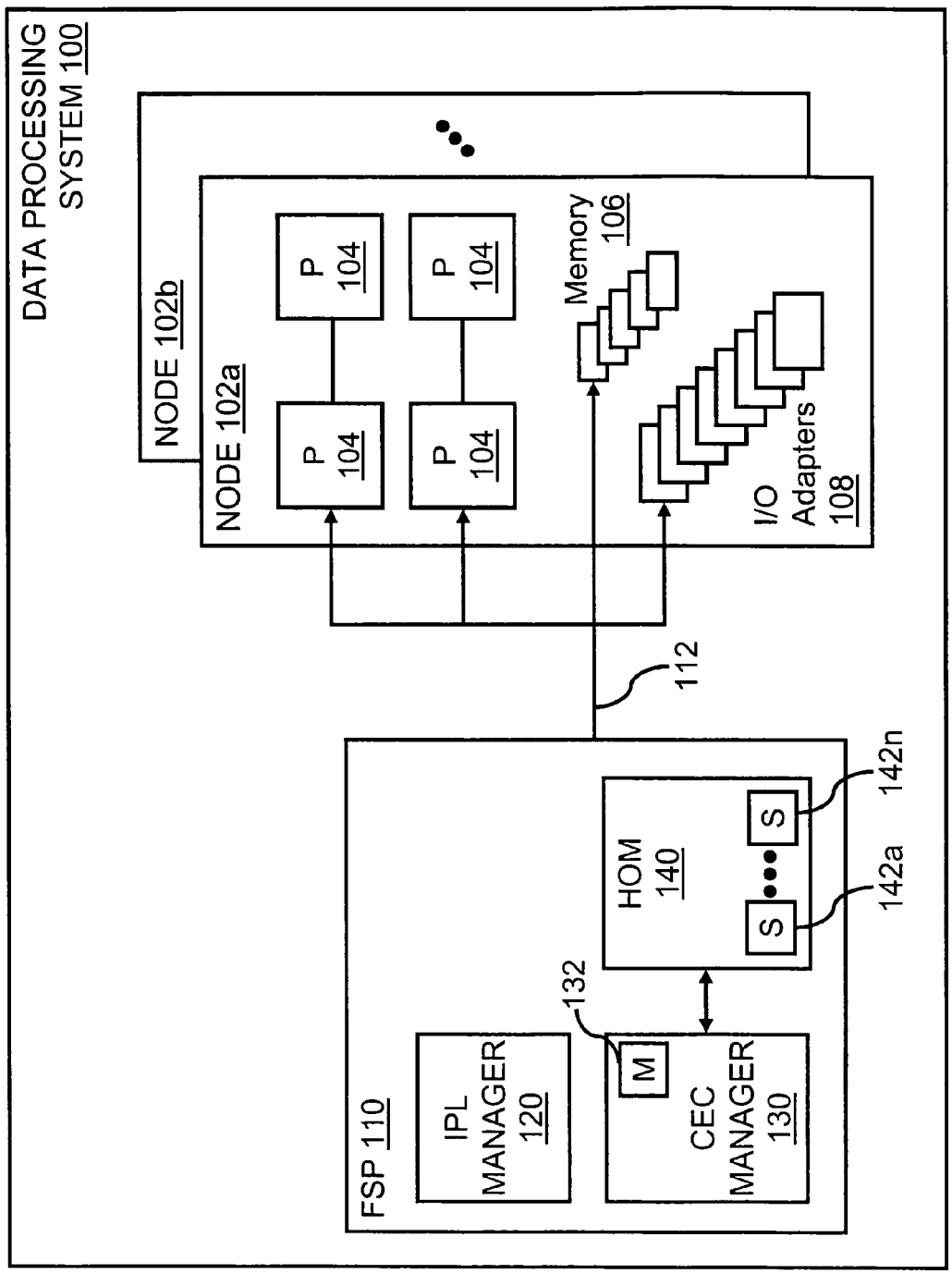
FIG. 1 is a high level block diagram of an exemplary data processing system in accordance with the present invention.

With reference now to FIG. 1, there is illustrated a high level block diagram of an exemplary data processing system 100 in accordance with the present invention. Data processing system 100 is a multiprocessor (MP) data processing system comprising one or more possibly heterogeneous nodes 102*a*-102*b*, each including one or more processors (P) 104. Each node 102, which may be implemented, for example, as a rack of hardware components, further includes memory 106 providing data storage for processors 104, one or more input/output (I/O) adapters 108 supporting I/O for the node 102, and may optionally include additional unillustrated hardware components. For simplicity, FIG. 1 omits illustration of the interconnect fabric that couples processors 104 to memory 106 and I/O adapters 108. During system operation, an additional node 102 or hardware component thereof (e.g., I/O adapter 108, processor circuit board, or memory circuit board) may be hot-added to data processing system 100, as described in further detail below. To support the hot-add of hardware components, the connectors and power buses of nodes 102 preferably provide initial electrical isolation as is conventional to prevent damage to both the hot-add hardware and the existing hardware components of data processing system 100.

Data processing system 100 further includes a flexible service processor (FSP) 110 connected to the individual circuit boards within nodes 102*a*-102*b* via one or more buses 112, which may implement, for example, the well-known Joint Test Action Group (JTAG) IEEE 1149.1 standard. FSP 110, which includes processing resources and associated memory, contains program code including a Central Electronics Complex (CEC) manager 130 that directly manages the hardware components of data processing system 100 (i.e., nodes 102 and their constituent processors 104, memory 106, I/O adapters 108, etc.) via JTAG commands transmitted via buses 112. To support management of data processing system 100, CEC manager 130 maintains and dynamically updates a Hardware Object Model (HOM) 140 that comprises one or more data structures providing a representation of the hardware components that are currently physically present in data processing system 100. HOM 140 includes, for each independently managed hardware component physically present within data processing system 100, a respective one of status indicators 142a-142n. Each status indicator 142a-142n has at least three states, namely: functional, meaning that the hardware component is powered on, has passed diagnostics, has been initialized, and is currently available for use and/or access; non-functional, meaning that the hardware component is not available for any use or access; and hot-add, meaning that the hardware component is available only for use and/or access by FSP 110. As described further below, the interpretation of status indicators 142, and hence the scope of applicability of a given command by CEC manager 130, is governed by the setting of a mode indicator 132 associated with CEC manager 130.

The program code of FSP 110 additionally includes an initial program load (IPL) manager 120. In a preferred embodiment, IPL manager 120 may comprise one or more scripts written in a well-known scripting language, such as UNIX shell (sh) or Kom shell (ksh). FSP 110 executes IPL manager 120 at cold boot to power on the hardware components of data processing system 100 and then to perform a sequence of diagnostic tests that verify functionality of the hardware and to initialize the integrated circuit chips within data processing system 100 for optimum performance of the given system configuration. IPL manager 120 performs the diagnostic and initialization steps by issuing commands to CEC manager 130, which in turn issues appropriate JTAG commands to the hardware components of data processing system 100. Following such diagnostic and initialization activities, the nodes 102 load and execute a hypervisor (i.e., supervisory firmware) and one or more operating system images of one or more operating systems. In accordance with the present invention, IPL manager 120 further performs diagnostic and initialization steps for hardware components hot-added to data processing system 100, permitting substantial code reuse in IPL manager 120 and CEC manager 130.

Figure 2:
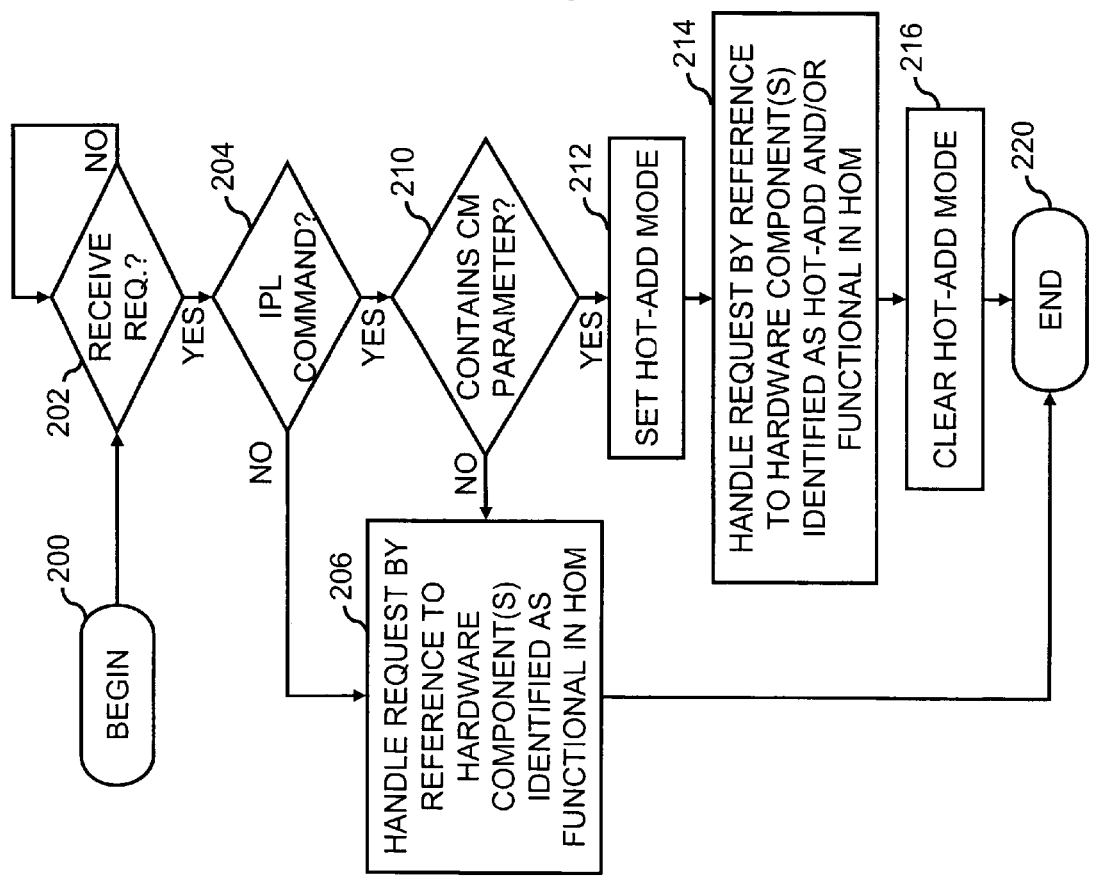
FIG. 2 is a high level logical flowchart of an exemplary method of handling requests to access data processing system hardware by reference to status information provided by a hardware object model.

Referring now to FIG. 2, there is depicted a high level logical flowchart of an exemplary method of handling a request to access data processing system hardware by reference to status information provided by a hardware object model (HOM). In the exemplary data processing system embodiment of FIG. 1, the depicted process is performed by CEC manager 130 in FSP 110. It should be noted that multiple such processes can be performed concurrently by FSP 110.

As illustrated, the process begins at block 200 and thereafter proceeds to block 202, which illustrates CEC manager 130 iterating until a request to perform a hardware management activity is received. In response to receipt of the request, CEC manager 130 services the request in accordance with the type of the request. For example, if the request is an IPL command received from IPL manager 120, CEC manager 130 services the request as shown at block 210 and following blocks, which are described below. If, however, the request originated from runtime software within one of nodes 102, as represented by the process proceeding from block 204 to block 206, CEC manager 130 handles the request by reference to only those hardware components identified by the status indicators 142 in HOM 140 as being in the functional state. Thus, for example, CEC manager 130 does not send JTAG commands to any hardware components indicated as non-functional or hot-add by status indicators 142 in response to receipt of a request by runtime software executed by nodes 102. Instead, CEC manager 130 services the request by transmitted one or more appropriate JTAG commands to one or more hardware components identified as being in the functional state by status indicators 142. Following block 206, the process terminates at block 220.

Referring now to block 210, in response to a determination by CEC manager 130 that the request received at block 202 is an IPL command received from IPL manager 120, CEC manager 130 examines the parameters of the IPL command to determine whether the IPL command contains a concurrent maintenance (CM) parameter indicating a desire to access a hot-added hardware component of data processing system 100. If not, the IPL command is handled as described above with respect to block 206, and the process thereafter terminates at block 220. If, however, the IPL command contains a CM parameter, CEC manager 130 sets mode indicator 132 to indicate a hot-add mode that enlarges the scope of hardware components available for access to CEC manager 130 to include both those indicated by status indicators 142 as functional and those indicated by status indicators 142 as hot-add (block 212). As shown at block 214, CEC manager 130 then handles the request by reference to (e.g., by sending one or more JTAG commands to) one or more hardware components identified by the status indicators 142 in HOM 140 as being in the hot-add and/or functional states. CEC manager 130 then clears the hot-add mode indicated by mode indicator 132 at block 216. Thereafter, the illustrated process terminates at block 220.

Figure 3:
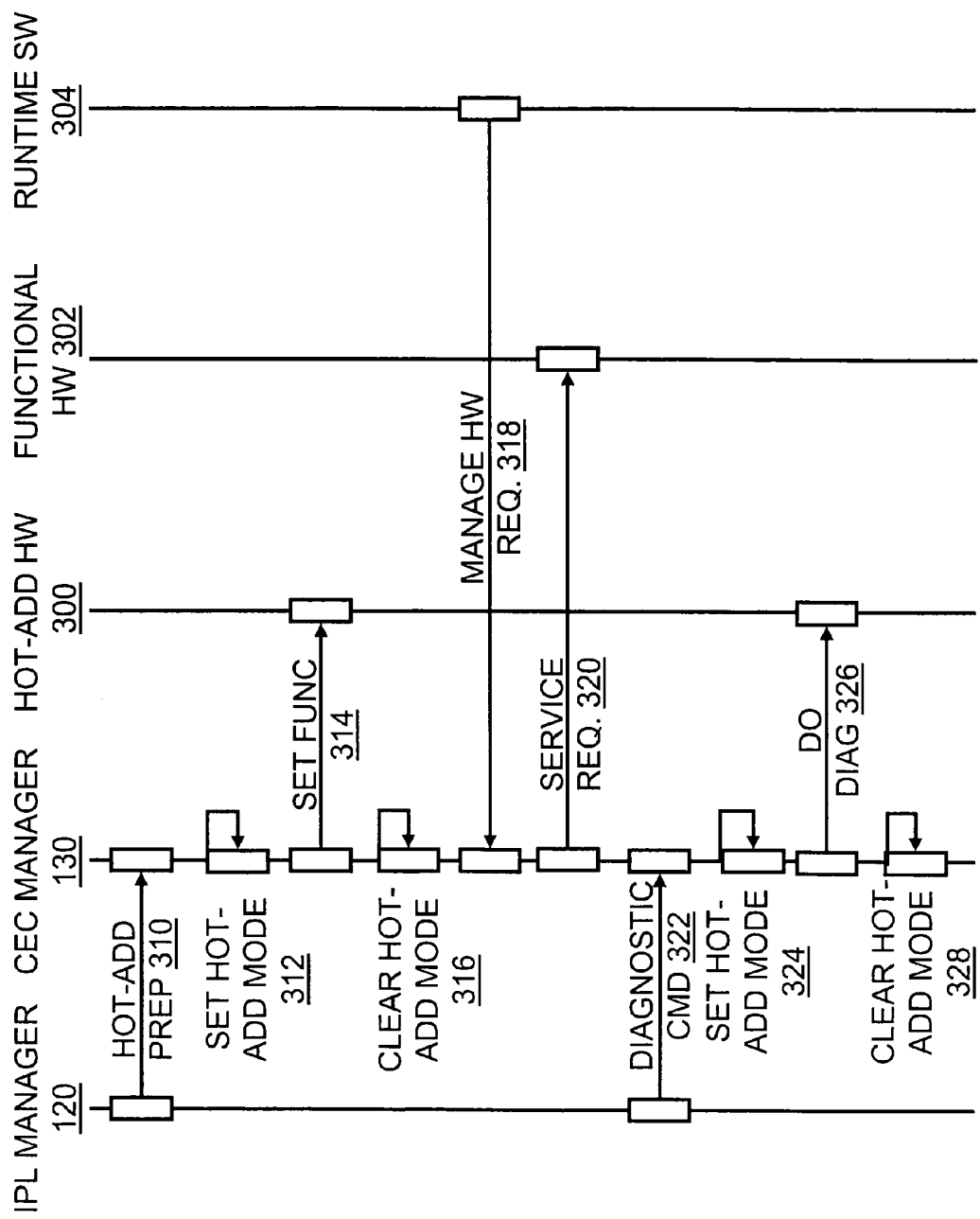
FIG. 3 is a time-space diagram of an exemplary operating scenario in which requests to access data processing system hardware are handled in accordance with the process depicted in FIG. 2.

FIG. 3 is a time-space diagram of an exemplary operating scenario in which requests to access data processing system hardware are handled in accordance with the process depicted in FIG. 2. In the exemplary operating scenario, IPL manager 120 detects the addition of hot-add hardware 300 during the operation of data processing system 100 either automatically or in response to entry of a command at an administrator console presented by IPL manager 120 in a conventional manner. In response, IPL manager 130 notifies CEC manager 130 of the addition of hot-add hardware 300 through a hot-add preparation (prep) command 310, which contains the CM parameter and may indicate a location in the system and/or type of the newly added hot-add hardware 300. In response to the hot-add preparation command 310, CEC manager 130 sets updates HOM 140 to reflect the physical presence of hot-add hardware 300 in data processing system 100, establishes an associated status indicator 142 in the hot-add state, and updates its mode indicator 132 to indicate the hot-add mode (reference numeral 312). While mode indicator 132 is set to indicate the hot-add mode, CEC manager 132 issues appropriate JTAG commands to set hot-add hardware 300 to a functional, powered-on state (reference numeral 314). CEC manager 132 thereafter clears the hot-add mode of mode indicator 132 to restore the scope of hardware components that can be accessed to only those indicated by status indicators 142 as being in the functional state.

Thereafter, CEC manager 130 may receive a request, such as manage hardware request 318, from runtime software 304 executing on functional hardware 302 (e.g., a node 102) of data processing system 100. In response to receipt of manage hardware request 318, which does not contain a CM parameter, CEC manager 130 services the request by issuing one or more JTAG commands (reference numeral 320) targeting one or more functional hardware components 302 indicated by status indicators 142 of HOM 140 as being in a functional state.

While performing management of functional hardware 302, as represented by reference numeral 320, CEC manager 130 may further receive a diagnostic command 322 from IPL manager 120, which instructs CEC manager 130 to initiate diagnostic tests of hot-add hardware 300 to ensure that hot-add hardware 300 is operating properly. Because diagnostic command 322 contains the CM parameter, CEC manager 130 sets its mode indicator 132 to the hot-add mode 324, thereby enlarging the scope of hardware components that can be accessed to include those indicated by status indicators 142 as being in the hot-add mode. CEC manager 130 also issues one or more JTAG commands instructing hot-add hardware 300 to perform the requested diagnostic tests (reference numeral 326). At the conclusion of the JTAG commands, CEC manager 130 clears the hot-add mode of its mode indicator 132, as depicted at reference numeral 328.

As has been described, the present invention provides an improved data processing system and method of data processing system providing support for the addition of hardware to a running system. According to the present invention, when a request for hardware management access is received by a hardware management component (e.g., CEC manager 130), a determination is made whether or not the request contains a parameter indicative of the intended scope of hardware to be accessed in response to the request. In response to the request, the hardware management component issues one or more hardware management commands having a scope selected in accordance with the determination.

While the invention has been particularly shown as described with reference to a preferred embodiment, it will be understood by those skilled in the art that various changes in form and detail may be made therein without departing from the spirit and scope of the invention. For example, although the present invention has been described with reference to an embodiment in which a broader scope of hardware access is achieved by specifying a parameter in a hardware access request, it will be appreciated that in other embodiments a narrow scope of hardware access may be achieved through the specification of a predetermined parameter in a hardware access request. In addition, while an illustrative embodiment of the present invention has been described in the context of a data processing system with installed program code, those skilled in the art will appreciate that program code embodying the functionality of the present invention is capable of being distributed as a program product in a variety of forms, and that an illustrative embodiment of the present invention applies equally regardless of the particular type of computer readable media used to actually carry out the distribution. Examples of computer readable media include storage media such as floppy disks, hard disk drives, CD ROMs, and transmission type media such as digital and analog communication links.

What is claimed is:

1. A method of data processing in a data processing system, said method comprising:
maintaining in the data processing system a hardware object model describing hardware components that are currently physically present in the data processing system;
maintaining in the hardware object model a respective status indicator for each of a plurality of separately managed hardware components of the data processing system, each status indicator having at least a hot-add state indicating a hot-added hardware component;
a hardware management component receiving, from a software component of the data processing system, a request for management access to a hardware component of the data processing system;
in response to receipt of the request for management access, the hardware management component determining whether or not the request contains a parameter indicative of the intended scope of hardware components to be accessed in response to the request; and
in response to the request, the hardware management component selecting a scope in accordance with the determination based upon a current state of at least one status indicator in the hardware object model and issuing one or more hardware management commands to one or more target hardware components of the data processing system within the selected scope, such that an operating state of the one or more target hardware components is modified.

2. The method of claim 1, wherein:
each status indicator also has a functional state indicating a functional hardware component; and
said step of selecting a scope comprises selecting a scope excluding all those hardware components for which the respective status indicator indicates the hot-add state in response to the determination.

3. The method of claim 1, wherein issuing one or more hardware management commands comprises issuing one or more hardware management commands that invoke diagnostic testing of a hot-added hardware component of the data processing system.

4. The method of claim 1, wherein issuing one or more hardware management commands comprises issuing one or more hardware management commands to initialize a hot-added hardware component of the data processing system.

5. The method of claim 1, wherein said selecting a scope comprises selecting the scope on a request-by-request basis.

6. A program product, comprising:
a tangible computer readable storage medium; and
program code within the tangible computer readable storage medium, wherein said program code causes a data processing system to perform:
maintaining in the data processing system a hardware object model describing hardware components that are currently physically present in the data processing system;
maintaining in the hardware object model a respective status indicator for each of a plurality of separately managed hardware components of the data processing system, each status indicator having at least a hot-add state indicating a hot-added hardware component;
a hardware management component receiving, from a software component of the data processing system, a request for management access to a hardware component of the data processing system;
in response to receipt of the request for management access, the hardware management component determining whether or not the request contains a parameter indicative of the intended scope of hardware components to be accessed in response to the request; and
in response to the request, the hardware management component selecting a scope in accordance with the determination based upon a current state of at least one status indicator in the hardware object model and issuing one or more hardware management commands to one or more target hardware components of the data processing system within the selected scope, such that an operating state of the one or more target hardware components is modified.

7. The program product of claim 6, wherein:
each status indicator also has a functional state indicating a functional hardware component; and selecting a scope comprises selecting a scope excluding all those hardware components for which the respective status indicator indicates the hot-add state in response to the determination.

8. The program product of claim 6, wherein issuing one or more hardware management commands comprises issuing one or more hardware management commands that invoke diagnostic testing of a hot-added hardware component of the data processing system.

9. The program product of claim 6, wherein issuing one or more hardware management commands comprises issuing one or more hardware management commands to initialize a hot-added hardware component of the data processing system.

10. The program product of claim 6, wherein selecting a scope comprises selecting the scope on a request-by-request basis.

11. A data processing system, comprising:
a plurality of hardware components including one or more processors and associated memory;
a hardware object model in the memory that describes hardware components that are currently physically present in the data processing system, the hardware object model including a respective status indicator for each of multiple separately managed hardware components of the data processing system, each status indicator having at least a hot-add state indicating a hot-added hardware component; and
a hardware management component that receives a request for management access to a hardware component of the data processing system and, responsive thereto, determines whether or not the request contains a parameter indicative of the intended scope of hardware components to be accessed in response to the request, wherein the hardware management component, responsive to the request, selects a scope in accordance with the determination based upon a current state of at least one status indicator in the hardware object model and issues one or more hardware management commands to one or more target hardware components of the data processing system within the selected scope, such that an operating state of the one or more target hardware components is modified.

12. The data processing system of claim 11, wherein:
each status indicator also has a functional state indicating a functional hardware component; and
the hardware management component selects a scope excluding all those hardware components for which the respective status indicator indicates the hot-add state in response to the determination.

13. The data processing system of claim 11, wherein the one or more hardware management commands comprise one or more hardware management commands that invoke diagnostic testing of a hot-added hardware component of the data processing system.

14. The data processing system of claim 11, wherein the one or more hardware management commands comprise one or more hardware management commands that initialize a hot-added hardware component of the data processing system.

15. The data processing system of claim 11, wherein the hardware management component selects the scope on a request-by-request basis.

* * * * *